United States Patent [19]

Anderlind et al.

[11] Patent Number: 5,267,845
[45] Date of Patent: Dec. 7, 1993

[54] APPARATUS FOR MANUFACTURING EXPANDABLE POLYSTYRENE (EPS) PELLETS

[75] Inventors: Erik T. Anderlind, Riverside; Erik W. Wehtje, Greenwich, both of Conn.

[73] Assignee: Polysource, Inc., Greenwich, Conn.

[21] Appl. No.: 882,001

[22] Filed: May 13, 1992

[51] Int. Cl.⁵ .............................................. B29C 47/88
[52] U.S. Cl. ..................................... 425/71; 264/143; 264/211.17; 264/211.2; 425/316; 425/378.2; 425/382.2; 425/464; 425/DIG. 230
[58] Field of Search ............... 425/192 S, 315, 316, 425/378.2, 382.2, 71, 464, DIG. 230; 264/143, 211.17, 211.2

[56] References Cited

U.S. PATENT DOCUMENTS

| | | | |
|---|---|---|---|
| 2,134,160 | 10/1938 | Kornegg | 264/143 |
| 2,153,031 | 4/1939 | Zetzsche et al. | 264/143 |
| 2,327,460 | 8/1943 | Rugeley | 264/143 |
| 2,939,177 | 6/1960 | Guentert et al. | 264/143 |
| 3,046,083 | 7/1962 | Bates et al. | 264/143 X |
| 4,003,773 | 1/1977 | Grable | 264/143 X |
| 4,150,595 | 4/1979 | Loffler et al. | 425/71 X |
| 4,413,965 | 11/1983 | Kinoshita et al. | 425/315 X |
| 4,482,517 | 11/1984 | Petrini et al. | 264/143 |
| 5,000,891 | 3/1991 | Green | 264/143 X |
| 5,186,959 | 2/1993 | Tanaka | 425/DIG. 230 |

Primary Examiner—Richard L. Chiesa
Attorney, Agent, or Firm—Fitzpatrick, Cella, Harper & Scinto

[57] ABSTRACT

A device for manufacturing expandable polystyrene (EPS) pellets includes a continuous process extruder, a die, a pelletizer and a hot water annealing quencher assembly. The pelletizer cuts strands of EPS material extruded from the extruder and die into uniform EPS pellets. The annealing quencher assembly includes a quencher tank, a water vortex substantially immersed therein for generating a slurry of water and EPS pellets discharged from the pelletizer, a quenching loop, and a slurry pump for pumping the slurry from the water vortex through the quenching loop to thereby anneal the EPS pellets.

13 Claims, 2 Drawing Sheets

APPARATUS FOR MANUFACTURING EXPANDABLE POLYSTYRENE (EPS) PELLETS

BACKGROUND OF THE INVENTION

1. Field of the Invention

The present invention relates generally to polystyrene materials, and more particularly, to an apparatus and method for manufacturing expandable polystyrene (EPS) pellets. EPS pellets or beads are used in various applications, including loose fill packing materials and foam formed or molded plastic materials.

EPS material is lightweight, inexpensive, and may be molded into rigid shapes to fit a wide variety of applications, such as coffee cups, egg crates or packing inserts. Thus, for many applications, EPS materials provide a superior alternative to other packaging materials in terms of price and quality.

Recently, EPS materials also have been used for manufacturing bicycle safety helmets. These helmets are lightweight and highly impact absorbent.

As background, finished polystyrene products are formed by expanding small pellets of EPS material. In finished form, these expanded pellets are comprised of many small cells, and they are fused together to form a molded part.

2. Description of the Prior Art

Systems for manufacturing EPS materials are known. For example, EPS materials may be made in large batch processors. In these systems, a large amount of raw materials (plastics, gas, plasticizer, and the like) are simultaneously processed and gassified to form EPS pellets or beads. Generally, in these batch systems, the size of the pellets can be controlled by selecting certain processing conditions (e.g., time, temperature, pressure, ingredients, and the like). However, the resulting pellets are not uniform. Rather, they vary in size, within a range of sizes corresponding to a standard bell curve distribution.

It also is known to manufacture EPS materials using a continuous process extruder system. In these systems, a continuous supply of raw materials is input to the extruder, heated, and mixed with a blowing agent (e.g., pentane gas) and a plasticizer. A plurality of strands of EPS material then are drawn from the extruder through perforations in a die, and cut into pellets of EPS material. However, in known extruding systems, the strand dimensions (e.g., diameter) often vary from perforation to perforation of the die based on a number of factors, including the die configuration and the spacing and relative heights of the perforations. Also, pressure variations at the die plate can lead to clogging of the perforations, and to further variations in strand dimensions (e.g., diameter). Thus, conventional extrusion systems often produce EPS pellets of non-uniform size.

Finally, it is known that the texture and finish of polystyrene products may be improved by annealing extruded EPS pellets prior to expanding them. Specifically, EPS material has a knurled texture when it is extruded. Thus, for example, it is known to anneal EPS pellets by conveying the EPS pellets through a steam chamber on a conveyor belt, to give the EPS pellets a more uniform, smooth surface texture and finish. However, it is difficult to achieve uniform annealing of EPS pellets using this method. Moreover, even if uniform annealing is achieved, the size, and texture or finish of the expanded pellets still may vary if the size or finish characteristics of the initial, unannealed EPS pellets varies.

SUMMARY OF THE INVENTION

It is therefore an object of the present invention to provide an improved apparatus and method for manufacturing EPS material having a greater uniformity in size, finish and texture.

These and other objects are achieved by the present invention, which includes a continuous process extruder and an extrusion die, the die including a generally conical extrusion channel having an annular cross-section and a die face having a plurality of orifices formed therein in a corresponding annular arrangement; a pelletizer; and means for annealing EPS pellets by hot water quenching, the annealing means including a water vortex, a slurry pump, and a quenching loop.

In another aspect of the present invention, the initial materials fed into the extruder may be raw materials, such as non-gassified plastics, pentane gas and plasticizer. Alternatively, existing polystyrene materials, such as off-spec or recycled polystyrene materials, may be used.

In yet another aspect of the present invention, gassified polystyrene is extruded through a conical channel extruder die to form uniform strands of EPS material. Extruded EPS strands are drawn down from the extruder die under tension, to selectively form EPS strands having a uniform diameter, and pulled through a water bath, where they are cooled from surface to core. The uniform EPS strands then are fed to a pelletizer, where they are uniformly cut into small EPS pellets or beads, which are blown out into a water vortex to form a homogeneous slurry of hot water and EPS pellets. The slurry is pumped through a quenching loop, to uniformly anneal the EPS pellets, and then to a separator, where the EPS pellets are separated out of the slurry to a spin dryer, where they are dried.

These and other aspects, features and advantages of the present invention readily will be apparent to those skilled in the art from the following detailed description of the present invention and the accompanying drawings.

DESCRIPTION OF A PREFERRED EMBODIMENT

Figure 1:
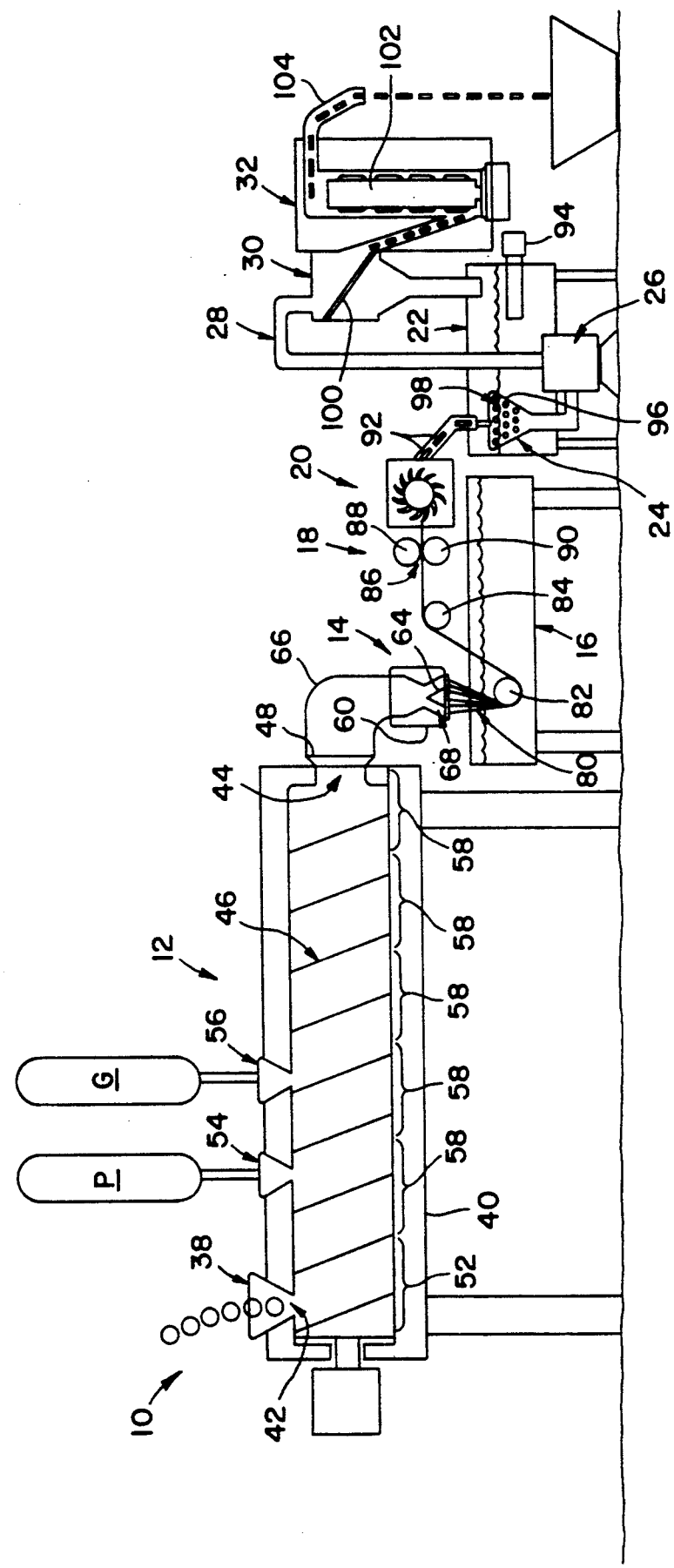
FIG. 1 is a schematic view of an embodiment of an EPS extrusion system according to the present invention, including a continuous process extruder, a die, a pelletizer, and a hot water quencher for annealing EPS pellets.

Referring now to the drawings, wherein like reference numerals designate like or similar parts throughout, FIGS. 1 to 4 illustrate one embodiment of an apparatus and method for manufacturing expandable polystyrene (EPS) pellets or beads according to the present invention. As shown in FIG. 1, the system generally includes a feeder 10, an extruder 12, a die 14, a water bath 16, a drive roller pair 18, a pelletizer 20, a quencher tank 22, a water vortex 24, a slurry pump 26, a quenching loop 28, a slurry separator 30, and a dryer 32.

Feeder 10 may be any conventional material feeder for feeding raw EPS materials to extruder 12. Specifically, in the present embodiment, feeder 10 includes a large feeder funnel 38 that receives densified crystal polystyrene bead feed stock under the influence of gravity. The nominal size of the polystyrene crystal beads is about ⅛ inch. This feed stock may be raw recycled crystal polystyrene that has been densified in a prior separate operation.

Extruder 12 may be any conventional continuous process EPS extruder. For example, in the present embodiment, extruder 12 is a barrel-screw extruder manufactured for Polysource, Inc., the assignee of the present invention, by the Berlyn Corporation.

Continuous process EPS extruders and their operation are known. Therefore, a detailed description thereof will not be presented here. However, extruder 12 of the present embodiment generally includes a housing 40, having an inlet 42 at a proximal end thereof, an outlet 44 at a distal end thereof, and a barrel screw 46 rotably mounted therein for receiving and translating by helical rotation a continuous supply of EPS materials from inlet 42 to outlet 44. Outlet 44 includes a flange 46 for receiving die 14, which is removably attached thereto in a fluid tight arrangement. Extruder 12 includes an initial heating zone 52 for melting the raw polystyrene materials, a first injection point 54 for injecting a plasticizer and a second injection point 56 for injecting a blowing agent, such as liquid pentane gas. As is known in the art, extruder housing 14 also may include a plurality of additional heating zones 58 along its length for controlling the melt of the EPS material as it is translated from inlet 42 to outlet 44 by barrel-screw 46, so that the EPS material extruded therefrom is a homogeneous mixture of the raw plastic materials, blowing agent, and plasticizer.

Figure 2:
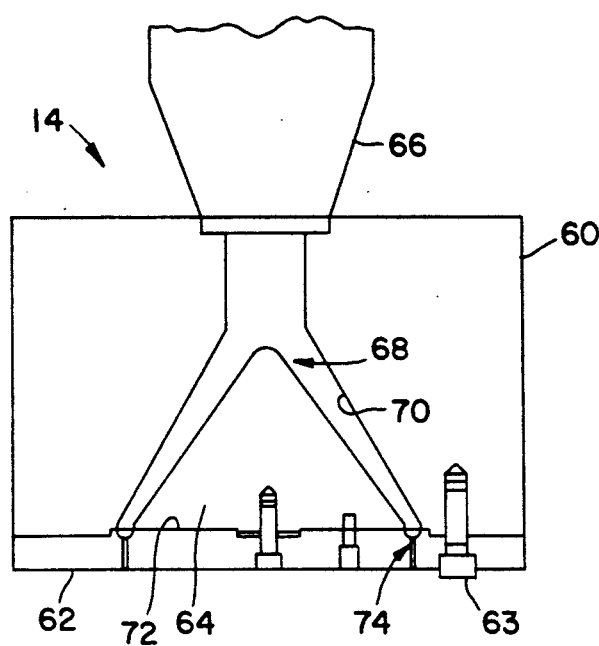
FIG. 2 is a cross-sectional view of an embodiment of the EPS extrusion die of FIG. 1, illustrating a die housing, a die plate and a counter cone insert for forming a conical distribution channel having an annular cross-section.
Figure 3:
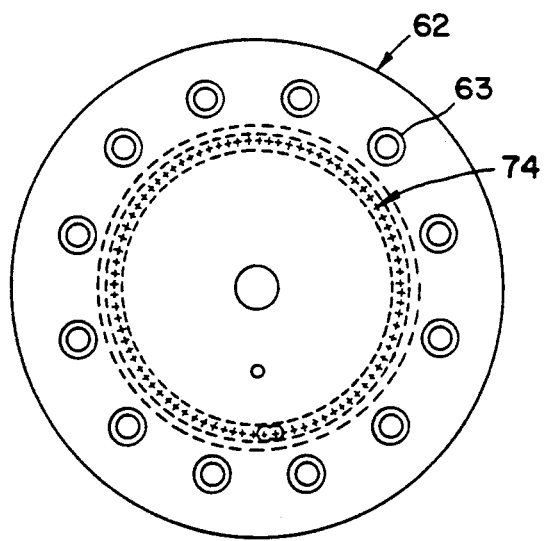
FIG. 3 is an end view of the die plate of the die of FIG. 2.
Figure 4:
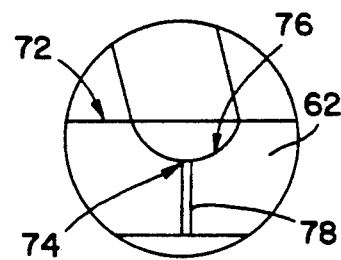
FIG. 4 is a cross-sectional view of an orifice of the die plate of FIG. 3.

Referring now to FIGS. 2 to 4, die 14 generally includes a die housing 60, a die plate 62, a counter cone 64 and a gooseneck sleeve 66. Gooseneck sleeve 66 is attached to flange 48 of outlet 44 in fluid-tight communication therewith, and effects a smooth, continuous 90° change in the direction of flow of he melt extruded from extruder 12, from a horizontal direction to a substantially vertical direction. Gooseneck sleeve 66 in turn is arranged in fluid-tight communication with a die chamber 68 formed by a channel wall 70 of die housing 60. Die plate 62 is removably attached to die housing 60, for example, by conventional screws 63. The generally conical counter cone 64 is attached to an interior surface 66 of die plate 62 so that, when assembled, die chamber 68 forms a generally conical channel between channel wall 70 and counter cone 64. Of course, it will be appreciated that, although channel wall 70 and counter cone 64 are described and illustrated as being conical, channel wall 70 and counter cone 64 may be arranged in any complementary configuration that creates a continuous distribution channel having a radially symmetrical or annular cross-section such as semispherical, parabolic, or the like. Moreover, die 14 preferably is arranged so that an axis of conical distribution channel 68 is vertical. In this manner, it will be appreciated that conical distribution channel 68 will provide a continuous, uniform flow of homogeneous EPS melt material to die plate 62. In particular, the pressure distribution of the EPS material flow will be uniform at each annular cross-section of the distribution channel of die chamber 68.

Referring now to FIG. 3, die plate 62 includes a plurality of orifices 74 formed therein in an annular configuration. FIG. 4 illustrates in cross section an orifice 74 of die plate 62. As shown therein, each orifice 74 is formed by a generally spherical recess 76 and a throughole 78 arranged coaxially therewith. As best shown in FIG. 2, the axis of die plate 62 is coaxial with the axis of die chamber 68, and each orifice 74 is arranged in fluid communication with the conical distribution channel formed by die chamber 68. Thus, it readily will be appreciated that this vertical coaxial arrangement of die chamber 68, counter cone 64, and the annular configuration of orifices 74, facilitates uniform extrusion of the EPS melt through orifices 74.

EPS material melt is extruded from orifices 74 to form a plurality of uniform EPS strands 80, which are drawn down into water bath 16 and reeved about a first guide roller 82 submerged in water bath 16. In this manner, strands 80 are cooled from surface to core. Strands 80 then are reeved over a second guide roller 84 disposed above water bath 16 to a nip 86 of drive roller pair 18. More specifically, stands 80 are pressed between a first drive roller 88 and a second drive roller 90, such that strands 80 are pulled under tension from orifices 74, and reeved under guide roller 82, over guide roller 84, and through nip 86 of drive roller pair 18. In the present embodiment, strands 80 are pulled at a tension of about 30 lbs, and the tension will be the same for each of the strands. However, for any particular application, the tension may vary for all of the strands as a whole, and those skilled in the art readily will be able to determine the optimum tension for a particular application.

Drive rollers 88, 90 and first and second guide rollers 82, 84 may be selected from any suitable conventional rollers. In the present embodiment, first and second guide rollers 82, 84 and drive roller 88 preferably are conventional solid polyethylene rollers suitable for use in a wet environment, and drive roller 90 is a rubber roller suitable for use in a wet environment. Drive roller 88 and drive roller 90 are pressed together, and both are rotably driven, for securely pressing and driving strands 80 through nip 86. Of course, those skilled in the art readily will appreciate numerous modifications and alternative arrangements suitable for drawing strands 80 under uniform tension.

The driving speed of drive rollers 88, 90 will vary depending upon the extrusion conditions. For example, it may vary depending on the materials, the size of orifices 74, and the temperature of water bath 16. In the present embodiment, extruder 12 is operated to extrude an EPS material melt at about 320° and about 2000 psi., the size of orifices 74 is about 1.0 mm. in diameter, the temperature of water bath 16 is about 80°, and the driving speed of drive rollers 88, 90 is about 2 ft./sec., so that strands 80 are drawn down from about 1.0 mm at orifices 74 to a uniform. diameter of about 0.6 mm at water bath 16, and pulled through water bath 16 for about 1 second, so as to cool strands 80 from surface to core. However, those skilled in the art readily will be able to select various optimum temperatures, pressures and drive speeds for any particular application.

Strands 80 are driven through nip 86 of drive rollers 18 to a pelletizer 20. Pelletizer 20 may be any conventional cutter suitable for cutting strands 80 into uniform EPS pellets 92. For example, in the present embodiment, pelletizer 20 is a 200 Series Pelletizer manufactured by the Jetro division of Conair, Inc., and includes a 60 tooth cutter and a 35 psi air nozzle for cutting and blowing out EPS pellets 92 in uniform lengths of about 1.8 mm. However, those skilled in the art readily will be able to select alternative devices suitable for any particular application.

Pellets 92 are blown out of pelletizer 20 into water vortex 24 disposed in quencher tank 22. Specifically, quencher tank 22 generally is filled with water, which is selectively maintained at a constant temperature by one or more water heaters 94 disposed in quencher tank 22. Water vortex 24 includes a funnel 96, which is substantially submerged in quencher tank 22, and arranged in fluid communication with slurry pump 26. Funnel 96 is provided with a plurality of perforations 98 formed therein, such that water in quencher tank 22 flows through perforations 98 into funnel 96. Thus, when slurry pump 26 draws water down through funnel 96, water is drawn through perforations 98 into funnel 96, and cascades down funnel 96 to create a vortex of water by the Coriolis effect. In this manner, pellets 92 blown out of pelletizer 20 into water vortex 24 mix with the cascading vortex of water to form a substantially uniform slurry of water and pellets.

Slurry pump 26 pumps the slurry of water and pellets through quenching loop 28 to slurry separator 30. In the present embodiment, slurry separator 30 includes an inclined sieve or mesh sheet 100 for separating the water from the pellets of the slurry, for returning the water to quencher tank 22, and for deflecting pellets 92 to dryer 32. In this manner, as described in greater detail below, quencher tank 22, water vortex 24, slurry pump 26 and quenching loop 28 provide means for annealing pellets 92 by hot water quenching.

The size of water vortex 24, the size and arrangement of perforations 98 in funnel 96, and the flow capacity of slurry pump 26 are selected to provide a substantially uniform slurry. More specifically, absent water vortex 24, since pellets 92 are small and lightweight, they ordinarily would tend to accumulate or coagulate on the surface of a water bath, and would not form a substantially uniform slurry, even if subsequently mixed, for example, by stirring. In the present embodiment, water vortex 24 has a funnel opening of about 17 cm, an inclination angle of about 15 degrees, a depth of about 23 cm, and 3 rows of perforations 98, which are about 5 mm in diameter and arranged about 6 cm apart. Of course, those skilled in the art readily will be able to select the optimum sizes and configurations of these elements for generating the desired cascading water vortex for any given application.

The flow capacity of slurry pump 26, the dimensions of quenching loop 28 and the temperature of the water in quencher tank 22 are selected to provide optimal annealing of pellets 92. Specifically, as the temperature of the water in quencher tank 22 rises, EPS pellets 92 will begin to anneal at a faster rate, and if EPS pellets 92 are exposed to an elevated temperature for too long, or are exposed to a temperature which is too high, they will begin to expand, and may coagulate in the quenching loop. Thus, as a general rule, the longer the slurry stays in quenching loop 28, the cooler the desired temperature of the water in quencher tank 22. For example, in the present embodiment, the temperature of the water in quencher tank 22 is selectively maintained at a temperature within the range of about 150° F. to 170° F., quenching loop 28 consists of a 3 inch diameter pvc tube about 20 ft. in length, and the flow rate of slurry pump 26 is selected so that the circulation time in quenching loop 28 is about 10 seconds. Slurry pump 26 is a model 2P015B fluid pump manufactured by Dayton Electric Mfg. Co., has a range of flow capacity of 0 to 300 liters/min, and preferably is set at a flow rate of about 190 liters/min. In this arrangement, it has been found that at or above a temperature of about 170° F., EPS pellets 92 immediately begin to expand, and may coagulate in quenching loop 28. On the other hand, at or below a temperature of about 150° F., EPS pellets 92 are not fully annealed, i.e., they do not achieve a desired surface texture or finish. However, those skilled in the art readily will be able to select the optimum equipment and conditions, including a pump having an appropriate range of flow capacity, suitable for any particular application.

As noted above, pellets 92 are separated from the slurry by slurry separator 30, and deflected to dryer 32 by a sieve or mesh sheet 100. For example, in the present embodiment, dryer 32 is a Model 5289 Dryer manufactured by Gala Industries, Inc. This dryer provides a rotating column 102 for drying annealed EPS pellets 92 as it transports them vertically upward by vortex action. Upon reaching the top of rotating column 102, the dried, annealed EPS pellets 92 are blown out of dryer 32 through a chute 104. Of course, those skilled in the art readily will appreciate alternative methods and devices for drying the annealed EPS pellets.

Accordingly, the present embodiment achieves each of the objects of the present invention. The continuous process extruder and die arrangement, including a die having a conical distribution channel, provides for extrusion of uniform diameter EPS strands, which may be cut to uniform lengths. These uniform EPS pellets then are annealed by hot water quenching to provide EPS pellets having uniform size and texture or finish, thus improving the finish of the ultimate polystyrene product.

Although the present invention has been described in detail with respect to a preferred embodiment thereof, it will be understood that this embodiment is illustrative only, and that the scope of the invention is not limited thereto. Moreover, those skilled in the art readily will appreciate numerous equivalent modifications, variations, or alternative embodiments of the present invention. Accordingly, the scope of the present invention is defined by the following claims, including all equivalents thereto that would readily be apparent to those skilled in the art.

What is claimed is:

1. An apparatus for manufacturing expandable polystyrene pellets, the apparatus comprising:

a continuous process extruder having an output port;

a die, including a die chamber forming a conical distribution channel in fluid communication with the output port of said extruder, and a die plate having a plurality of orifices arranged in an annular configuration complementary with an annular cross section of said distribution channel and in fluid communication therewith;

tension means for drawing down under tension a plurality of strands of expandable polystyrene material respectively extruded from said plurality of orifices;

a pelletizer for cutting each of said plurality of strands into a plurality of uniform pellets; and means for annealing said plurality of pellets by hot water quenching.

2. An apparatus as recited in claim 1, wherein said die further comprises a counter cone removably attached to an inner surface of said die plate, said die housing having a conical chamber wall forming a conical chamber in said housing, said counter cone having a conical surface complementary to said conical chamber wall, whereby said conical distribution channel is formed between said conical chamber wall and said counter cone.

3. An apparatus as recited in claim 2, wherein an axis of said conical distribution channel is arranged to be substantially vertical.

4. An apparatus as recited in claim 1, wherein an axis of said conical distribution channel is arranged to be substantially vertical.

5. An apparatus as recited in claim 1, wherein said conical distribution channel is semispherical.

6. An apparatus as recited in claim 1, wherein said conical distribution channel is parabolic.

7. An apparatus as recited in claim 1, wherein said tension means includes a water bath, a first roller disposed in said water bath, a second roller disposed above said water bath, and a drive roller pair, and wherein said plurality of strands are pulled under tension from said die, reeved under said first roller, over said second roller and through a nip formed by said drive roller pair, and wherein each of said plurality of strands is cooled by water in said water bath from a surface to a core thereof.

8. An apparatus as recited in claim 1, further comprising a drier and a separator arranged for separating annealed pellets from said annealing means and for directing said annealed pellets to said drier.

9. An apparatus as recited in claim 1, wherein said annealing means comprises:
   a quencher tank having a volume of hot water therein;
   water vortex means for forming a slurry of hot water and pellets in said hot water quencher tank;
   a quenching loop; and
   a slurry pump in fluid communication with said water vortex means and said quenching loop for pumping the slurry of hot water and pellets formed by said water vortex means through said quenching loop to anneal the pellets.

10. An apparatus as recited in claim 9, wherein said water vortex means comprises a funnel substantially submerged in the volume of hot water in said quencher tank, said funnel having a plurality of perforations formed therein and arranged such that hot water in said quencher tank flows through said perforations and cascades down an interior face of said funnel to form a water vortex.

11. An apparatus as recited in claim 9, further comprising a drier and a separator arranged for separating annealed pellets from said annealing means and for directing said annealed pellets to said drier.

12. An apparatus as recited in claim 11, wherein said separator comprises a sieve.

13. An apparatus as recited in claim 11, wherein said separator comprises a mesh sheet for deflecting said pellets to said drier.

* * * * *

UNITED STATES PATENT AND TRADEMARK OFFICE
CERTIFICATE OF CORRECTION

PATENT NO. : 5,267,845
DATED : December 7, 1993
INVENTOR(S) : Erik T. Anderlind, et al.

It is certified that error appears in the above-indentified patent and that said Letters Patent is hereby corrected as shown below:

<u>COLUMN 3</u>

Line 46, "he" should read --the--.

<u>COLUMN 4</u>

Line 6, "cross section" should read --cross-section--.
Line 25, "stands 80" should read --strands 80--.
Line 60, "uniform." should read --uniform--.

<u>COLUMN 5</u>

Line 49, "6 cm" should read --6 mm--.

Signed and Sealed this

Twentieth Day of December, 1994

Attest:

BRUCE LEHMAN

Attesting Officer  Commissioner of Patents and Trademarks